Patented Jan. 7, 1930

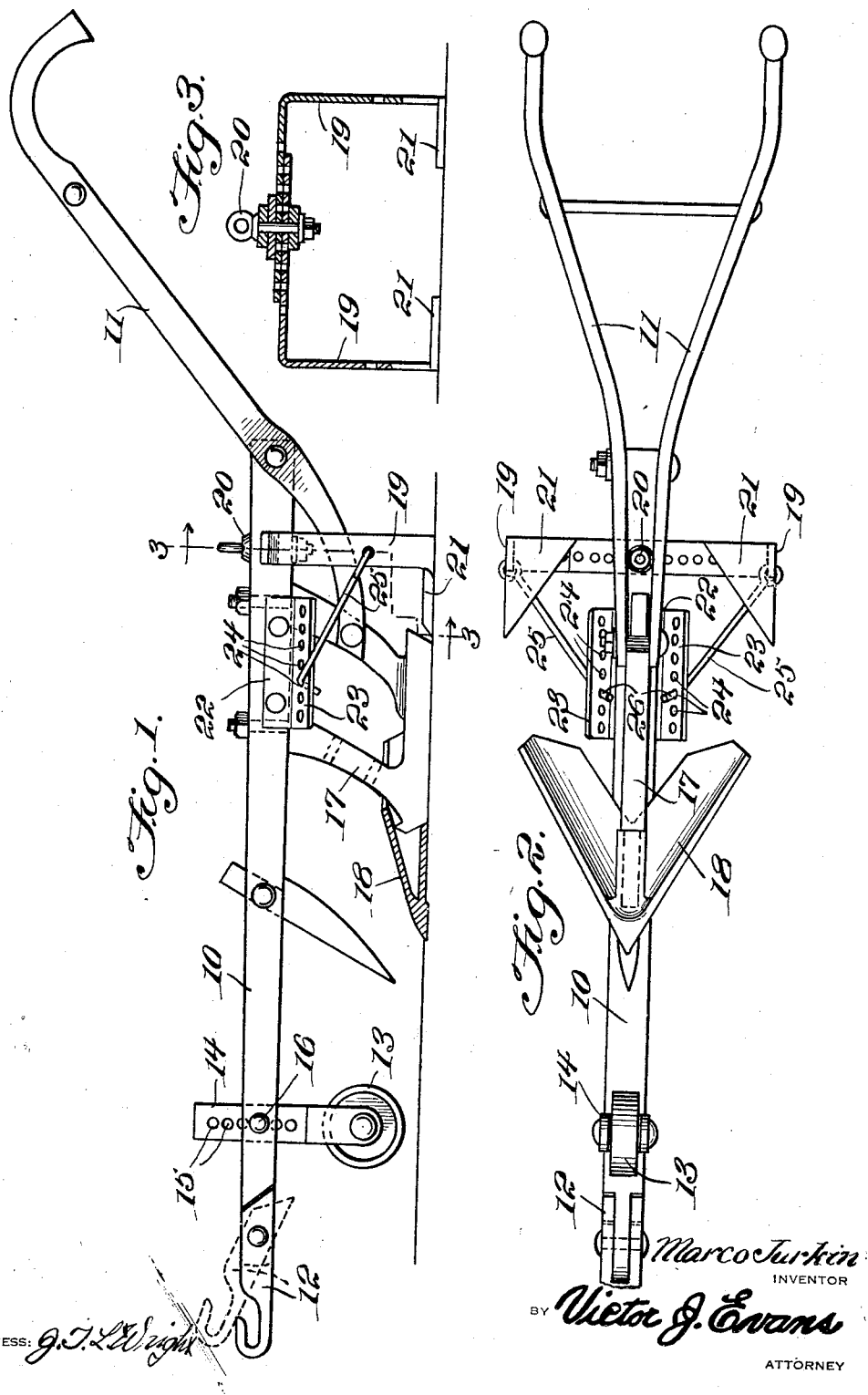

1,743,037

UNITED STATES PATENT OFFICE

MARCO JURKIN, OF METCALF, ILLINOIS

PLOW

Application filed December 3, 1927. Serial No. 237,527.

This invention relates generally to agricultural implements and contemplates a structure which can be used as a cultivator and weeder, or quickly and conveniently converted into either a right or left hand plow or middle breaker, the invention residing in the construction, combination and arrangement of parts as claimed.

In the drawings forming part of this application, like numerals of reference indicate similar parts in the several views, and wherein:

Figure 1 is a side elevation of the cultivator and weeder.

Figure 2 is a bottom plan view.

Figure 3 is a sectional view on line 3—3 of Figure 1.

Referring to the drawings in detail, and more particularly to Figures 1 and 3 inclusive, 10 indicates a plow beam, the handles of which are indicated at 11. Pivotally mounted on the forward end of the beam is a hitch 12, while the front ground wheel 13 is journaled in a vertically adjustable standard 14 to regulate the depth at which the plow shares enter the ground. The standard 14 is preferably provided with a series of openings 15 adapted to singly receive a bolt or the like 16. Depending from the plow beam 10 is the usual standard 17 with which the plow share 18 is associated, the latter being designed to receive the pointed extremity of the standard as clearly illustrated in Figure 1.

Arranged at the rear of the standard 17 is the combined sub-soiler and weeder constructed of relatively adjustable sections 19, each of which includes a horizontal apertured portion adapted to slide through an opening in the beam 10, and held fixed relatively thereto by a suitable bolt or fastening element 20. Consequently, the sections 19 can be adjusted toward and away from each other as the occasion may require, each section being provided with a substantially triangular shaped blade 21 which travels beneath the surface of the ground and utilized to cut the weeds or the like. Secured to the opposite side of the plow beam 10 are plates 22 each having an angular extension 23 provided with a plurality of openings 24. Brace rods 25 having offset extremities 26 are adapted to be received by the openings 24, these rods being arranged in divergent relation and secured in any suitable manner to the sections 19 are the combined sub-soiler and weeder. Consequently this structure is suitably braced and afforded the desired rigidity for the purpose intended.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

In a plow of the character described having a beam, a combined sub-soiler and weeder depending from the beam and including a substantially U-shaped member having companion sections horizontally adjustable toward and away from each other, said sections being overlapped, means for holding said sections fixed relatively in given positions, apertured plates projecting laterally from the opposed sides of the beam, a vertical limb of each section having an opening, and brace rods having their extremities received by the openings in said plates and in the vertical limbs of said sections for the purpose specified.

In testimony whereof I affix my signature.

MARCO JURKIN.